United States Patent
Jakowski et al.

(10) Patent No.: US 10,254,409 B2
(45) Date of Patent: Apr. 9, 2019

(54) METHOD AND DEVICE FOR DETERMINING AT LEAST ONE SAMPLE-POINT-SPECIFIC VERTICAL TOTAL ELECTRONIC CONTENT

(71) Applicant: Deutsches Zentrum fuer Luft- und Raumfahrt E.V., Cologne (DE)

(72) Inventors: Norbert Jakowski, Neustrelitz (DE); Mohammed Mainul Hoque, Berlin (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 330 days.

(21) Appl. No.: 15/022,277

(22) PCT Filed: Sep. 15, 2014

(86) PCT No.: PCT/EP2014/069607
§ 371 (c)(1),
(2) Date: Mar. 16, 2016

(87) PCT Pub. No.: WO2015/036590
PCT Pub. Date: Mar. 19, 2015

(65) Prior Publication Data
US 2016/0282472 A1    Sep. 29, 2016

(30) Foreign Application Priority Data

Sep. 16, 2013  (DE) .................. 10 2013 218 492

(51) Int. Cl.
*G01S 19/07*  (2010.01)
*G01S 19/09*  (2010.01)

(52) U.S. Cl.
CPC .............. *G01S 19/07* (2013.01); *G01S 19/09* (2013.01)

(58) Field of Classification Search
CPC .................................. G01S 19/07; G01S 19/09
(Continued)

(56) References Cited

U.S. PATENT DOCUMENTS 5,428,358 A * 6/1995 Gardner ................... G01S 5/14
                                                     342/26 D
5,828,336 A    10/1998 Yunck et al.
(Continued)

FOREIGN PATENT DOCUMENTS

DE    102013208040 B3    8/2014
EP        2637040 A1    9/2013
FR        2737014 A1    1/1997

OTHER PUBLICATIONS

Bolaji et al. "Ionospheric Time-delay over Akure Using Global Positioning System Observations"; Acta Geophysica; vol. 63, No. 3, Jun. 2015, pp. 884-899.*

(Continued)

*Primary Examiner* — Chuong P Nguyen
(74) *Attorney, Agent, or Firm* — Laurence A. Greenberg; Werner H. Stemer; Ralph E. Locher (57) ABSTRACT

A device and a method determine a sample point specific vertical total electronic content which is the electron content along a sample point specific vertical path that extends through the center of the earth and the sample point. A first inclined total electronic content is determined and refers to the electron content along an inclined beam path. A first and a further sample point along the beam path are selected. An initial sample point specific vertical total electronic content is determined for each sample point. An increment electron content is determined and refers to the electron content of the increment associated with the sample point. A further inclined total electronic content is determined. A sample point specific conversion function is determined. The sample point specific vertical total electronic content is (Continued)

determined from the first inclined total electronic content and the sample point specific conversion function.

12 Claims, 4 Drawing Sheets

(58) Field of Classification Search
USPC .......................................... 342/357.44, 357.46
See application file for complete search history.

(56) References Cited

U.S. PATENT DOCUMENTS

| | | | | |
|---|---|---|---|---|
| 7,502,689 | B2* | 3/2009 | Jakowski | G01S 19/14 342/26 B |
| 8,181,511 | B2* | 5/2012 | Meier | G01W 1/00 702/2 |
| 9,395,443 | B2* | 7/2016 | Trilles | G01S 19/40 |
| 9,557,419 | B2* | 1/2017 | Drescher | G01S 19/13 |
| 9,576,082 | B2* | 2/2017 | Sparks | G01S 19/07 |
| 9,651,668 | B2* | 5/2017 | Trilles | G01S 19/13 |
| 2012/0119944 | A1 | 5/2012 | Chen | |
| 2013/0234886 | A1* | 9/2013 | Trilles | G01S 19/21 342/357.59 |
| 2014/0152497 | A1* | 6/2014 | Trilles | G01S 19/13 342/357.51 |
| 2014/0163938 | A1* | 6/2014 | Sparks | G01S 19/07 703/2 |

OTHER PUBLICATIONS

Jakowski et.al., "Relationship between GPS-signal propagation errors and EISCAT observations", Ann. Geophysicae 14, pp. 1429-1436, Springer Verlag, 1996.
Davies, K., "Ionospheric Radio", Peter Peregrinus Ltd, London, ISBN 086341186X, pp. (60-65, 138), 1990.
Hoque, M. M., "Higher order ionospheric propagation effects and their corrections in precise GNSS positioning", Dissertation Universität Siegen, DLR-Forschungsbericht, 2009-29, ISSN 1434-8454, 2009, pp. 206-212.
Hernandez-Pajares, M et al., "Towards a more realistic ionospheric mapping function", XXVIII URSI General Assembly, Delhi, India (2005).
Hoque, M. M. et al. "Estimate of higher order ionospheric errors in GNSS positioning", Radio Science., vol. 43, No. RS5008, doi: 10.1029/2007RS003817 (2008).
Hoque, M. M. et al., "A new global model for the ionospheric F2 peak height for radio wave propagation", Annales Geophysicae 30, pp. 797-809, 2012, doi: 10.5194/angeo-30-797-2012.
Jakowski, N. et al. (2011a) "TEC Models and their use in ionosphere Monitoring" Radio Science., vol. 46, RS0D18, doi: 10.1029/2010RS004620, 2011.
Jakowski, N. et al., (2011b) "A new global TEC model for estimating transionospheric radio wave propagation errors", Journal of Geodesy, 2011, DOI 10.1007/s00190-011-0455-1.
Komjathy, A. et al., "A new ionospheric model for wide area differential GPS: The Multiple Shell Approach", ION National Technical Meeting, pp. 460-466, Monterey, CA, Jan. 2002.
Nava B. et al., "A new version of the NeQuick ionosphere electron density model", Journal of Atmospheric and Solar-Terrestrial Physics, 70, (2008), pp. 1856-1862, DOI:10.1016/jastp.2008.01.015.
RTCA Special Committee 159 Working Group 2, "Minimum Operational Performance Standards for Global Positioning System / Wide Area Augmentation System Airborne Equipment," RTCA Document No. DO-229A Jun. 1998—Abstract only.
Sakai, T. et al., "Modeling Vertical Structure of Ionosphere for SBAS", 22nd International Meeting of The Satellite Division of the Institute of Navigation, Savannah, GA, Sep. 22-25, 2009.
Mannucci A. J. et al., "Assessment of global TEC mapping using a three-dimensional electron density model", Journal of Atmospheric and Solar-Terrestrial Physics 61 (1999) pp. 1227-1236.
Fleury R, et al.: "Modelling of ionospheric high-order errors for new generation GNSS", Annales des telecommunications—Annals of Telecommunications, get Lavoisier, Paris, FR. vol. 64, No. 9-10, Oct. 1, 2009, (Oct. 1, 2009), pp. 615-623, XP001548453, ISSN : 003-4347, DOI: 10.1007/S12243-009-0090-5.

* cited by examiner

METHOD AND DEVICE FOR DETERMINING AT LEAST ONE SAMPLE-POINT-SPECIFIC VERTICAL TOTAL ELECTRONIC CONTENT

BACKGROUND OF THE INVENTION

Field of the Invention

The invention concerns a method and device for determining at least one sample point specific vertical total electronic content.

The electromagnetic radio waves of all satellite based communications and/or navigation systems are subject to the interaction with the plasma of the ionosphere. The interaction is dispersive, i.e. strongly frequency dependent (proportional to $1/f^2$) and practically insignificant at oscillation frequencies f of more than 10 GHz. In the L-Band range used by the GNSS (Global Navigation Satellite Systems), the ionospheric propagation effects cannot be neglected. Therefore, knowledge of the current state of the ionosphere and resorting to error compensation measures are important.

Measurements of the code phase and the carrier phase are the basis of position determination with GNSS. The measured phase is determined by the phase-length ∫nds, where n is the ionospheric refractive index and s is referred to as the path length (or propagation path) element. In the geometric optics the propagation of the radio waves is further determined from Fermat's principle (the principle of the shortest arrival time), so that the propagation path with the minimum phase-length is to be found. For a refractive index n not equal to 1 this results in a lengthened beam path or transition time error compared to the comparison case of propagation of the wave in a vacuum. Ultimately in a GNSS the effect of the error is such that it causes errors in the distance between the satellites and the receiver determined by the receiver of the signals. In particular, a curvature of the beam path and an interaction of the wave with the medium that the wave passes through come under consideration as error sources. The invention is not limited to GNSS, however.

A complex nonlinear relationship of various geophysical parameters, for example ionization state, magnetic field state, and geometric parameters, for example elevation and/or azimuth, is used for the refractive index. The first approximation of the refractive index causes distance errors of the order of magnitude of up to about 100 m, which can be eliminated in GNSS by means of dual-frequency measurements. The corresponding methods are known. The higher order errors in the refractive index ($\sim 1/f^m$, m>2) are of the order of magnitude of up to several centimeters.

It has already been proposed to correct first order errors (m=2) and errors caused by the curved propagation path by measurement and analysis of signals that have been received at different carrier frequencies (oscillation frequencies).

If only a single frequency receiver is provided, then no simple and accurate error correction is possible. In a single frequency measurement, a code phase can be represented in simplified form by $$\Phi = ro + di + de \qquad \text{Formula 1}$$

where Φ denotes the code phase, ro denotes the distance between the transmitter and receiver, di denotes the ionospheric propagation error along the beam path and de denotes the remaining distance errors, such as for example clock errors.

The ionospheric propagation error can be more than 100 m, depending on the degree of ionization of the ionosphere. A suitable correction is therefore desirable, in particular in the area of space travel.

It is also known to perform an ionosphere correction depending on so-called vertical ionosphere errors, wherein to a first approximation the ionosphere error is proportional to a vertical total ionization of the ionosphere in relation to a surface area. The vertical total ionization or the vertical total electronic content is often also referred to as the TEC (total electron content). The vertical ionosphere error is used here as a reference for the calculation of an error along an arbitrarily oriented beam path described by an elevation angle and an azimuth. However, the real ionosphere is generally highly simplified for this. For example, in the absence of further information, it is assumed that the ionization is concentrated in a thin layer (thin shell model). A suitable transformation or mapping function will be referred to below as Thin-Shell-MF. One such Thin-Shell-MF is for example described in Jakowski et. al., "Relationship between GPS-signal propagation errors and EISCAT observations", Ann. Geophysicae 14, pp. 1429-1436, Springer Verlag, 1996. An ionosphere altitude of 350 km is also described therein.

The simplifying assumption is made inter alia because in practice a distribution of the electron density along a beam path from the transmitter to the receiver is unknown. With the aforementioned thin shell model, it is assumed that the ionosphere is concentrated in a thin layer at an altitude of about 350 km to 400 km. By means of a geometric mapping function and with the adoption of the thin shell model, a defined vertical total electronic content at the point of intersection of the beam path with the thin ionosphere layer is converted into an electron content along the beam path.

Here, however, the usually varying electron density along the beam path is disadvantageously neglected. Likewise, vertical and horizontal gradients of the ionization are not taken into account. This can result in uncorrected residual errors of more than 10 m.

Vertical total electron contents for different latitudes and longitudes can be summarized in so-called TEC correction maps. If the thin shell model is used to produce said TEC correction maps, then there are already systematic errors during the generation of the correction maps, which can be propagated further and increased during the reverse transformation. In augmentation systems such as WAAS and EGNOS, the errors may not exceed predetermined threshold values according to the high safety standards that are usual in space travel. Both a very accurate calculation of the vertical TEC correction maps and also a best possible use of said maps for the error correction of the inclined beam paths are thus desired.

The subsequently published DE 10 2013 208 040.9 discloses a method and a device for determining an error during the propagation of an electromagnetic wave in an atmosphere comprising electrically charged particles. In the document it is described that an electron content along a beam path from the transmitter to the receiver can be calculated as the sum of electron contents of a plurality of increments or segments of the beam path. The electron contents of the increments are in turn determined depending on a vertical electron density distribution. Said vertical electron density distribution is in turn given by an analytically integratable physically realistic model of the vertical electron density distribution in the ionosphere, the integral of which corresponds to the predetermined vertical electron content. The formula for the Chapman layer that can be derived from the Chapman theory gives a realistic description of the vertical electron density distribution for example.

The book K. Davies, "Ionospheric Radio", Peter Peregrinus Ltd, London, ISBN 086341186X, pages (60-65, 138), 1990 provides a realistic description of a vertical electron density distribution in the ionosphere.

The publication M. M. Hogue, "Higher order propagation effects and their corrections in precise GNSS positioning", Siegen University Dissertation, DLR Research Report 2009-09, ISSN 1434-8454, 2009, Pages 218-224 describes an analytical solution of an integral over an electron density distribution.

This raises the technical problem of providing a method and device for the accurate determination of at least one sample point specific vertical total electronic content, wherein the vertical total electron contents determined in this way can then be used for more accurate determination of a propagation error or the improved determination of a residual error of an electromagnetic wave in an atmosphere, and hence also for more accurate position determination.

BRIEF SUMMARY OF THE INVENTION

It is a fundamental idea of the invention to take into account a vertical electron density distribution during the determination of sample point specific vertical total electron contents from for example an electron content measured along a beam path from a transmitter to a receiver, wherein the sample points are disposed along the beam path. Said vertical electron density distribution can be given by an analytically integratable physically realistic model of the vertical electron density distribution in the ionosphere, the integral of which corresponds to the predetermined vertical electron content. A realistic description of the vertical electron density distribution can be provided for example by the formula for the Chapman layer that can be derived from the Chapman theory. The method thus enables a reverse transformation of a total electronic content of an inclined beam path into at least one sample point specific vertical total electronic content.

A method is proposed for determining at least one sample point specific vertical total electronic content.

The sample point specific vertical total electronic content refers here to an electron content along a sample point specific vertical path that extends through the center of the Earth and a suitable sample point. The sample point can be disposed here at a predetermined altitude, in particular in an ionosphere. The altitude can be measured relative to sea level for this.

Furthermore, a first inclined total electronic content is determined, wherein the first inclined total electronic content refers to an electron content along an inclined beam path.

The inclined beam path refers to a beam path of an electromagnetic wave in the atmosphere, for example between a transmitter and a receiver. The beam path can for example be determined depending on geometric parameters, for example an elevation angle and/or a zenith angle. Inclined can in particular mean here that the elevation angle of the beam path is different from 90° at a point of intersection with the surface of the Earth. In other words, the inclined beam path does not intersect the surface of the Earth perpendicularly.

The first inclined total electronic content can be detected here by sensor, in particular measured. The first inclined total electronic content can also be determined depending on an error during the propagation of an electromagnetic wave along the beam path. For example, a transition time error of a radio signal can be detected. The propagation and transition time error can for example be detected or determined by means of a so-called dual-frequency based measurement. In a dual-frequency based measurement, a propagation error can be determined by the measurement and analysis of signals that have been received at different carrier frequencies (oscillation frequencies). Depending on the propagation and transition time error, the first inclined total electronic content can in turn be determined, for example depending on known relationships between transition time errors and electron content.

The sample point that corresponds to the sample point specific vertical total electronic content that is to be determined preferably lies on the inclined beam path. The sample point specific vertical path along which the sample point specific vertical total electronic content arises thus intersects the beam path at the sample point.

Furthermore, a first and at least one further sample point along the beam path are selected. At least one of the sample points can be disposed along the beam path between the transmitter and the receiver. Furthermore, a sample point can be selected as the position of the transmitter or receiver. The sample points thus divide the beam path into at least two increments.

Preferably, however, more than two sample points are selected along the beam path, whereby the beam path is divided into more than two increments.

One of the sample points is preferably the sample point that forms the point of intersection of the beam path and of the sample point specific vertical path, along which the sample point specific vertical total electronic content to be determined arises.

An increment or segment of the beam path thus refers to a part of the beam path that lies between a sample point and the neighboring sample point along the beam path.

Furthermore, an initial sample point specific vertical total electronic content is determined for each of the sample points selected along the beam path. The initial sample point specific vertical total electronic content refers here to a starting value or initial value for an electron content along a sample point specific vertical path that extends through the center of the Earth and the corresponding sample point. Of course, said definition includes that the vertical total electronic content refers to an electron content along or in a sample point specific vertical column with a predetermined base area, the central longitudinal axis of which extends through the center of the Earth and the corresponding sample point.

The vertical total electronic content can also be referred to as the vertical TEC (total electron content).

The vertical total electronic content can be determined as the integral of a sample point specific vertical electron density distribution, which is described in more detail below, from the surface of the Earth or the bottom of the ionosphere above approx. 50 km to infinity.

As described in more detail below, the initial sample point specific vertical total electron contents can be known in advance or can be determined based on a model. In particular, said initial sample point specific vertical total electron contents can be determined regardless of the previously determined first inclined total electronic content.

Furthermore, an increment electron content is determined depending on the initial sample point specific vertical total electronic content and the sample point specific vertical electron density distribution, wherein the increment electron content refers to an electron content of the increment associated with the sample point. Said increment can for example be the adjoining increment along the beam path at the corresponding sample point. In particular, the increment can refer to the segment of the beam path between the corresponding sample point and the neighboring sample point along the beam path. The same is also referred to below as the neighboring sample point. The neighboring sample point of the first sample point can for example be the further sample point. For the last sample point along the beam path, the increment refers to the segment of the beam path between the last sample point and an end point, for example the position of the transmitter or of the receiver. A direction along the beam path can for example be oriented from the receiver to the transmitter, but also vice-versa.

The sample point specific vertical electron density distribution describes here the density distribution along the previously described vertical path. If said electron density distribution is known, for example can be described or determined by a function, then an electron content of a sub segment of the previously described vertical path between two mutually different altitudes can also be determined. If the beam path runs along the sample point specific vertical path, then the increment electron content of the increment between the corresponding sample point and the neighboring sample point or the end point can be determined directly. Finally, as in most cases, the sample point specific vertical path and the beam path enclose an angle of incidence, and thus the electron content of the sub segment of the vertical path can be converted into the increment electron content depending on the angle of incidence or the elevation angle, as described in detail below.

The sample point specific vertical electron density distribution enables the determination of the increment electron content, in particular exclusively, having regard to the previously described sample point specific vertical total electronic content.

A further inclined total electronic content is then determined depending on the increment electron contents. For example, all increment electron contents determined in this way can be added to form a resulting electron content.

Hence the method described in the aforementioned DE 10 2013 208 040.9 is carried out in order to determine the further inclined total electronic content regardless of the determination of the first inclined total electronic content. Here the further inclined total electronic content is determined along the same beam path as the first inclined total electronic content.

Regarding the determination of the further inclined total electronic content, full reference can therefore also be made to the disclosure of DE 10 2013 208 040.9. The advantages mentioned in the document also arise, in particular the improved and more accurate determination of an electron content of the beam path in comparison with the previously described thin shell model.

The beam path between the transmitter and the receiver is preferably broken down into at least two increments. The number of increments can be determined depending on the elevation, the horizontal resolution of the vertical TEC data (for example that can be read from a TEC map) and the magnitude of the horizontal gradient. Depending on the number of increments, a number of sample points also thus arises along the beam path. The specific vertical total electronic content of the respective sample point is then determined for each sample point from the available input information, wherein an increment electron content, which refers to an electron content along the beam path between said sample point and the neighboring sample point or the end point, is determined depending on said sample point specific vertical total electronic content and the sample point specific vertical electron density distribution. The beam path specific total electronic content, which can also be referred as the inclined total electronic content, is then the sum of all increment electron contents.

It is possible to define sample points exclusively at positions along the beam path between the transmitter and the receiver.

Furthermore, a sample point specific conversion function between the further inclined total electronic content and the initial sample point specific vertical total electronic content is determined. Sample point specific means here that the conversion function is determined for each of the sample points, but in particular for the sample point that forms the point of intersection between the inclined beam path and the vertical path along which the vertical total electronic content that is being sought arises.

Said conversion function can also be referred to as a mapping function and describes a relationship between the inclined total electronic content and the initial sample point specific vertical total electronic content.

Furthermore, the at least one sample point specific vertical total electronic content is determined depending on the first inclined total electronic content and the sample point specific conversion function.

A more accurate determination of a sample point specific vertical total electronic content advantageously results from this, wherein the coarse vertical structure of the ionosphere is taken into account. This in turn advantageously enables the generation of more accurate TEC maps and hence also maps of the vertical transition time error, wherein the vertical transition time error can be determined from the corresponding sample point specific vertical total electron content of the TEC maps, for example depending on a previously known relationship. Said vertical propagation errors that can be read from the TEC map can then be used as the basis for the calculation of transition time errors along arbitrary inclined beam paths, for example by means of the method described in DE 10 2013 208 040.9. A TEC map provides, as described in more detail below, information about a vertical total electronic content depending on a latitude and longitude.

In a further embodiment, the sample point specific conversion function is determined as the ratio of the further inclined total electronic content and the initial sample point specific vertical total electronic content, in particular as the division of the further inclined total electronic content by the initial sample point specific vertical total electronic content. The further inclined total electronic content is generally different from the first inclined total electronic content.

Furthermore, the at least one sample point specific vertical total electronic content that is being sought is determined as the ratio of the first inclined total electronic content and the sample point specific conversion function, in particular as the division of the first inclined total electronic content by the sample point specific conversion function.

The result of this is advantageously a simple computational determination.

In a further embodiment, the initial sample point specific vertical total electronic content is previously known. Alternatively, the initial sample point specific vertical total electronic content can be determined based on a model. The determination that is based on a model can in particular be carried out depending on the previously described thin shell model.

Of course, however, other models for determining a sample point specific vertical total electronic content can also be used.

The initial sample point specific vertical total electronic content can also be generated depending on code phase and carrier phase measurements of the global GNSS on dual-frequency measurements.

The result of this is advantageously a simple and reliable determination of starting values or initial values for the proposed method.

In a further embodiment, all initial sample point specific vertical total electron contents are the same. This corresponds to an assumption of spherical symmetry. This means that the vertical TEC is constant along for example the ionosphere track of the inclined beam path (projection of the beam path in the thin spherical ionosphere shell).

Thus the determination of a single sample point specific vertical total electronic content is advantageously sufficient as the initial value for the proposed method.

In a further embodiment, initial sample point specific vertical total electron contents are determined depending on horizontal gradient information of the vertical total electronic content. Said horizontal gradient information can be known or can be determined. In particular, said horizontal gradient information relates to defined altitude, in particular the altitude of the sample points. Horizontal gradient information thus describes the difference between vertical total electron contents of different sample points. A horizontal gradient is clearly determined along a spherical surface here.

For example, horizontal gradient information can be determined depending on a model. A-priori information about horizontal TEC gradients can thus be introduced into the calculation by means of the model. If the model is trustworthy, it can result in an improvement of the accuracy of the proposed method. Horizontal gradient information can also be determined from an existing TEC map of vertical TEC, for example. Such a TEC map can for example be produced by the determination of vertical TEC by means of the thin shell model that is described above.

Improved accuracy of the proposed method also results from this.

In a further embodiment, the initial sample point specific vertical total electron contents are determined depending on a TEC map, wherein the TEC map provides information about a vertical total electronic content as a function of a latitude and a longitude.

If a longitude and latitude of a sample point can be determined, for example by projection of the sample point along the vertical path onto the surface of the Earth, then the vertical total electronic content can be determined depending on the TEC map. Of course, if a value is not directly associated with a sample point in the TEC map, a vertical total electronic content can be determined depending on a value at at least one closest neighboring point, wherein a corresponding value is associated with the neighboring point. This can for example be carried out by an interpolation method.

One such TEC map can be called up via http://swaciweb.dlr.de for example.

Here the TEC map can be generated in dual-frequency measurements depending on code phase and carrier phase measurements of the global GNSS.

Advantageously, the result of this is accurate knowledge of the vertical total electronic content at the sample points along the projection of the observed beam path, wherein this in turn increases the accuracy of the proposed method. The proposed method can in this case be used for a re-determination of the TEC contained in the map.

In a further embodiment, the method is carried out for a plurality of sample points. Thus for example a plurality of values of a TEC map can advantageously be determined again.

Furthermore, the increment electron content can be determined depending on a vertical increment electron content and on an angle of intersection between the beam path and the sample point specific vertical path. The vertical increment electron content refers to an electron content along the sample point specific vertical path between an altitude of the first sample point and an altitude of the neighboring sample point. The incident angle or elevation angle of the beam path, which varies with altitude above the surface of the Earth, can advantageously be taken into account through this.

The angle of intersection between the beam path and the sample point specific vertical path can in particular be referred to as an angle enclosed by the beam path and a straight line perpendicularly intersecting the sample point specific vertical path and passing through the sample point.

The vertical increment electron content can thus be transformed onto the beam path by means of a geometric transformation formula and can then be referred to as the beam path specific increment electron content.

With varying altitude of the sample points above the surface of the Earth, the angle of intersection that is described above also changes. The division of the beam path into a plurality of increments thus advantageously causes a more accurate geometric transformation of a vertical increment electron content to a beam path specific increment electron content.

In a further embodiment, the sample point specific electron density distribution is determined or described based on a model, in particular by an analytically integratable function.

Here the sample point specific electron density distribution can be described for example by a function, in particular a function parameterized by one or a plurality of parameters. A Chapman profile function is preferably used here, which enables an analytically integratable physical description of the vertical electron density distribution. One such Chapman profile function is for example described in the book K. Davies, "Ionospheric Radio", Peter Peregrinus Ltd, London, ISBN 086341186X, pages (60-65, 138), 1990.

Parameters of a Chapman profile function are a solar zenith angle of the sample point specific vertical path, a maximum electron density, an altitude of the maximum electron density above sea level and a scale height of the neutral atmosphere in the altitude region of the ionosphere.

The specific electron density distribution model-based sample point thus describes an electron density depending on an altitude above sea level along the sample point specific vertical path.

The model-based sample point specific electron density distribution, in particular at least one parameter of said electron density distribution, can be selected so that an integral from zero to infinity over said sample point specific electron density distribution yields the previously described and known vertical total electronic content results, or at most deviates therefrom to a predetermined extent.

The knowledge of the vertical total electronic content thus advantageously enables a very accurate model-based description of the electron density distribution. The determination of the previously described vertical increment electron content can then be carried out depending on the model-based, sample point specific electron density distribution. In particular, said vertical increment electron content can be determined as the integral over said electron density distribution from an altitude of the sample point up to an altitude of the neighboring sample point.

If the Chapman profile function that is described above is selected as the model-based sample point specific electron density distribution, then said integral can advantageously also be determined analytically by segment depending on the (known) vertical total electronic content. This is for example described in M. M. Hogue, "Higher order propagation effects and their corrections in precise GNSS positioning", Siegen University Dissertation, DLR-Research Report 2009-09, ISSN 1434-8454, 2009, Pages 218-224.

The model-based sample point specific electron density distribution advantageously enables good physical modeling of the vertical electron density distribution here, wherein the same in turn enables more accurate determination of an increment electron content. This in turn enables more accurate determination of the propagation errors as described above.

Furthermore, at least one parameter of the sample point specific electron density distribution can be determined depending on the sample point specific vertical total electronic content. Advantageously, the relationship that is described above is used here, whereby the integral from zero to infinity over the electron density distribution results in or estimates the previously known vertical total electronic content. The at least one parameter can be selected, for example by suitable parameter optimization, such that the value of the integral deviates as little as possible from the previously known vertical total electronic content.

This advantageously enables parameterization of the electron density distribution.

Furthermore, at least one parameter of the sample point specific electron density distribution can be fixedly predetermined or determined based on a model or by a measurement technique. In particular, at least one parameter can be determined before carrying out the method according to the invention.

The fixed determination of at least one parameter advantageously enables a simple and hence rapid determination of the vertical increment electron content apart from a small residual error.

By contrast, the model-based or measurement technology-based determination of at least one parameter enables a very realistic parameterization of the electron density distribution, which results in a more accurate determination of the propagation error.

In a further embodiment, the electron content along the beam path is also determined depending on a plasmasphere-related component.

A correction term that quantitatively forms a plasmasphere-related component in the total electronic content can be added here to the sum of all inclined increment electron content for example. The correction term also enables, besides the formation of a plasmasphere-related component, the formation of residual errors resulting from the description of the electron density distribution by the Chapman profile function, in particular the formation of higher order terms that can be present in the analytical description by the Chapman profile function.

The plasmasphere-related component can also be determined for example by means of an additional profile function for the vertical electron density profile of the plasmasphere above approx. 800-1000 km, wherein the additional profile function can be added to and integrated with the sample point specific electron density distribution. In this case the plasmasphere-related component is also taken into account during the determination of the increment electron content.

Alternatively, the plasmasphere-related component can also be determined depending on measurements.

This advantageously enables a further improved determination of the beam path specific electron content.

Furthermore, a distance between a sample point and a neighboring sample point along the beam path can be greater than 0 km and less than 10000 km. In particular, the distance can lie within a range from 20 km to 100 km. Distances between sample points can be equal to or different from each other here.

A first sample point can also be disposed at a predetermined altitude above sea level, for example at an altitude greater than 50 km.

Furthermore, the distance to the neighboring sample point along the beam path can be determined depending on the magnitude of the vertical total electronic content and/or on a horizontal gradient of the vertical total electronic content and/or the elevation of the beam path.

Here, the horizontal gradient of the vertical total electron content is mapped to the gradient along the projected beam path, wherein the beam path refers to a spherical layer, as applied in the use of the thin shell mapping function. Here the point of intersection of the beam path with said spherical layer, which for example can be a fixed layer that is usually at an altitude of 350 or 400 km, forms the so-called ionospheric piercing point. The spherical layer can thus contain the ionospheric piercing point.

Alternatively, the information about the magnitude of the horizontal gradient can also be derived from the predetermined information, for example a TEC map, by estimating the meridional and zonal gradients of the vertical total electronic content in the environment between the geographical receiver position and the geographical satellite position.

In this case, the greater the magnitude of the vertical total electronic content and/or of the gradient, the shorter is the distance to the neighboring sample point.

Furthermore, a large vertical total electronic content and a large gradient generally arise for a small elevation, which necessitates a large incrementation.

For example, the distance to the neighboring sample point along the beam path can be determined depending on a latitude of the sample point. With increasing latitude of the sample points, a distance can preferably also increase.

As a result, it can advantageously be taken into account that the vertical total electronic content in the region of low latitudes changes more than in the region of high latitudes. The improvements that can be achieved by the method are particularly significant at small elevation angles.

Alternatively or additionally, the distance can be selected depending on a time of day and/or the strength of the solar activity.

Furthermore, a device is proposed for determining at least one sample point specific vertical total electronic content. The device comprises at least one analyzer. One of the previously described methods can be implemented by means of the analyzer here. In particular, the device can be designed so that one of the previously described methods can be implemented. In particular, the device can comprise a means for determining the previously described first inclined total electronic content.

BRIEF DESCRIPTION OF THE SEVERAL VIEWS OF THE DRAWING

The invention is described in detail using an exemplary embodiment. The figures show.

DESCRIPTION OF THE INVENTION

In the following, identical reference characters denote elements with identical or similar technical features.

In the proposed method a first inclined total electronic content and a further inclined total electronic content are determined, wherein the sample point specific vertical total electronic content vTEC1, vTEC2, vTEC3, vTEC4 that is being sought is then determined depending on said inclined total electron contents. A description of the determination of the further inclined total electronic content is also contained in the descriptions for FIG. 1 and FIG. 2.

Figure 1:
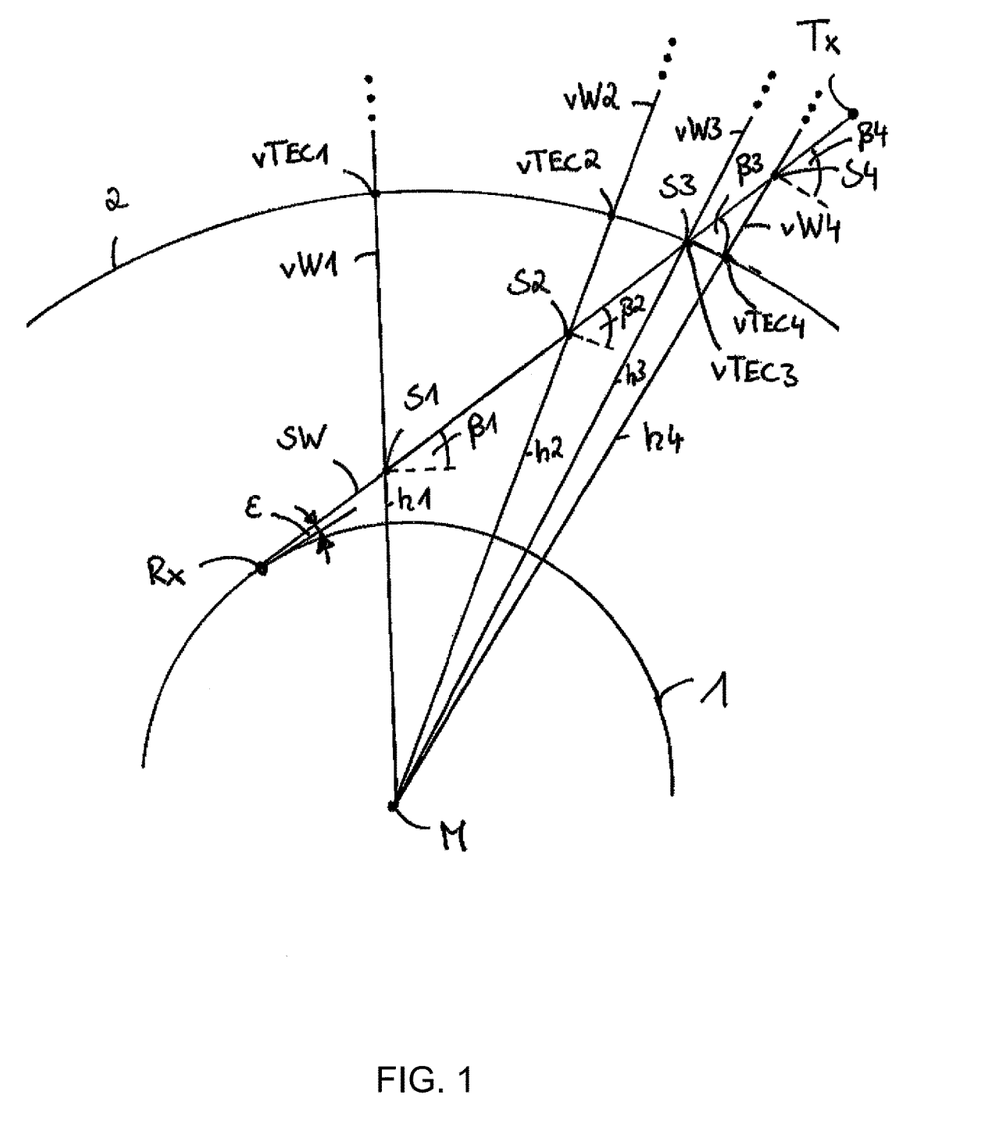
FIG. 1 a schematic representation of a segmented beam path.

A segmented beam path SW is schematically illustrated in FIG. 1. The beam path SW extends between a transmitter Tx and a receiver Rx, wherein the receiver Rx is disposed on a surface of the Earth 1. Four sample points S1, S2, S3, S4 are disposed along the beam path SW by way of example. In this case the first sample point S1 is at a first altitude h1 above the surface of the Earth 1, in particular above a defined level, for example sea level, of the surface of the Earth 1. Accordingly, the further sample points S2, S3, S4 are located at further altitudes h2, h3, h4, wherein the altitudes h1, h2, h3, h4 increase along the beam path SW from the receiver Rx to the transmitter Tx. One end point of the beam path SW is formed by the transmitter Tx here.

Furthermore, sample point specific vertical paths vW1, vW2, vW3, vW4 are illustrated. Said vertical paths vW1, . . . , vW4 intersect both the corresponding sample point S1, . . . , S4 and the center of the Earth M.

An initial vertical total electronic content vTEC1, vTEC2, vTEC3, vTEC4 can be determined along said sample point specific vertical paths vW1, . . . vW4 for each of said vertical paths vW1, . . . vW4. It is illustrated here that the initial vertical total electron contents vTEC1, vTEC2, vTEC3, vTEC4 are contained in a so-called TEC map 2. In the TEC map 2, the initial vertical total electron contents vTEC1, vTEC2, vTEC3, vTEC4 are mapped into a spherical layer, wherein the initial vertical total electron contents vTEC1, vTEC2, vTEC3, vTEC4 can be determined from the TEC map 2 depending on a latitude and a longitude of points of intersections of the vertical paths vW1, vW2, vW3, vW4 with said layer or with a surface of the Earth 1.

Furthermore, it is assumed that a vertical electron density distribution along said vertical paths vW1, . . . , vW4 can be described by a Chapman profile function in accordance with $$ne(h) = N0 \cdot \exp(0.5 \cdot (1 - z - \sec x \cdot \exp(-z))) \quad \text{Formula 2,}$$

wherein h denotes an altitude above sea level, ne denotes the electron density, N0 denotes a maximum electron density along the corresponding vertical path vW1, . . . , vW4, x denotes a solar zenith angle and z is given by $$z = (h - h0)/H \quad \text{Formula 3,}$$

wherein h0 denotes an altitude of the maximum electron density N0 and H denotes a scale height of the neutral atmosphere. The scale height H is defined by $H = k \cdot T/m \cdot g$, where k is the Boltzmann constant, T is the neutral gas temperature, m is the molecular mass of the neutral gas and g is the acceleration due to gravity in the altitude region of the ionosphere.

An integral from zero to infinity over the electron density distribution given in Formula 2 gives the initial vertical total electronic content vTEC1, . . . vTEC4 illustrated in FIG. 1, apart from plasmasphere components that are to be taken into account separately.

In order to determine an increment electron content of an increment of the beam path SW, which is disposed between the neighboring sample points S1, . . . , S4, a so-called vertical increment electron content is determined in a first step. This is described by way of example for the increment between the first two sample points S1, S2.

The vertical increment electron content is determined here as the integral from h1 to h2 over the electron density distribution given in Formula 2.

Said integral can, as stated in M. M. Hogue, "Higher order propagation effects and their corrections in precise GNSS positioning", University of Siegen Dissertation, DLR-Research Report 2009-09, ISSN 1434-8454, 2009, Pages 218-224, be analytically determined depending on the initial vertical total electronic content vTEC1.

With said calculation, the further parameters of the electron density distribution given by Formula 2, in particular the scale height H and the altitude h0, can be determined as fixed predetermined values or determined by a measurement technique or based on a model.

If the initial vertical total electronic content vTEC1 is known, then the analytical solution that is described above can be carried out depending on the initial vertical total electronic content vTEC1, but regardless of knowledge of the maximum electron density N0.

The corresponding vertical increment electron content vIEC12 can thus be determined apart from a small residual error ΔTEC.

The vertical increment electron content vIEC12 can be transformed depending on the elevation angle β1 into a beam path specific, inclined increment electron content iIEC12 between the first and the second sample points S1, S2. This can be determined for example by $$iIEC12 = vIEC12/(sqrt(1 - ((h1 + RE) \cdot \cos \beta 1)/(h01 + RE))^2)) \quad \text{Formula 4,}$$

wherein in this case h01 denotes the altitude of the maximum electron density N0 along the first vertical path vW1 and RE denotes the radius of the Earth.

In FIG. 1 it can be seen that the elevation angle βi varies with increasing altitude h, wherein ε denotes an elevation angle of the beam path SW at the surface of the Earth 1.

The further inclined total electronic content along the beam path SW is given by the sum of all beam path specific, inclined increment electron contents iIEC, wherein the last increment is disposed between the fourth sample point S4 and the end point. An estimated total residual error can be added to the sum that describes the higher order terms that can be present owing to the analytical description by Formula 2.

It is also possible to add a plasmasphere-related component P to the previously described sum of the inclined increment electron contents iIEC. Said plasmasphere component P can be determined depending on geophysical parameters, such as for example a time of day, a latitude and a measure of the solar activity and/or further parameters. The estimated total residual error that is described above can thus be modified with a tuning factor so that the plasmasphere component is taken into account approximately.

The scale height H (see for example Formula 3) can be predetermined as a fixed predetermined parameter. It is however also possible that the scale height H is determined based on a model. In this case the scale height can for example be determined depending on a time of year, a solar activity and/or further parameters.

The altitude h0 of the maximum electron density can for example be specified at 350 km and the scale height H at 70 km.

Figure 2:
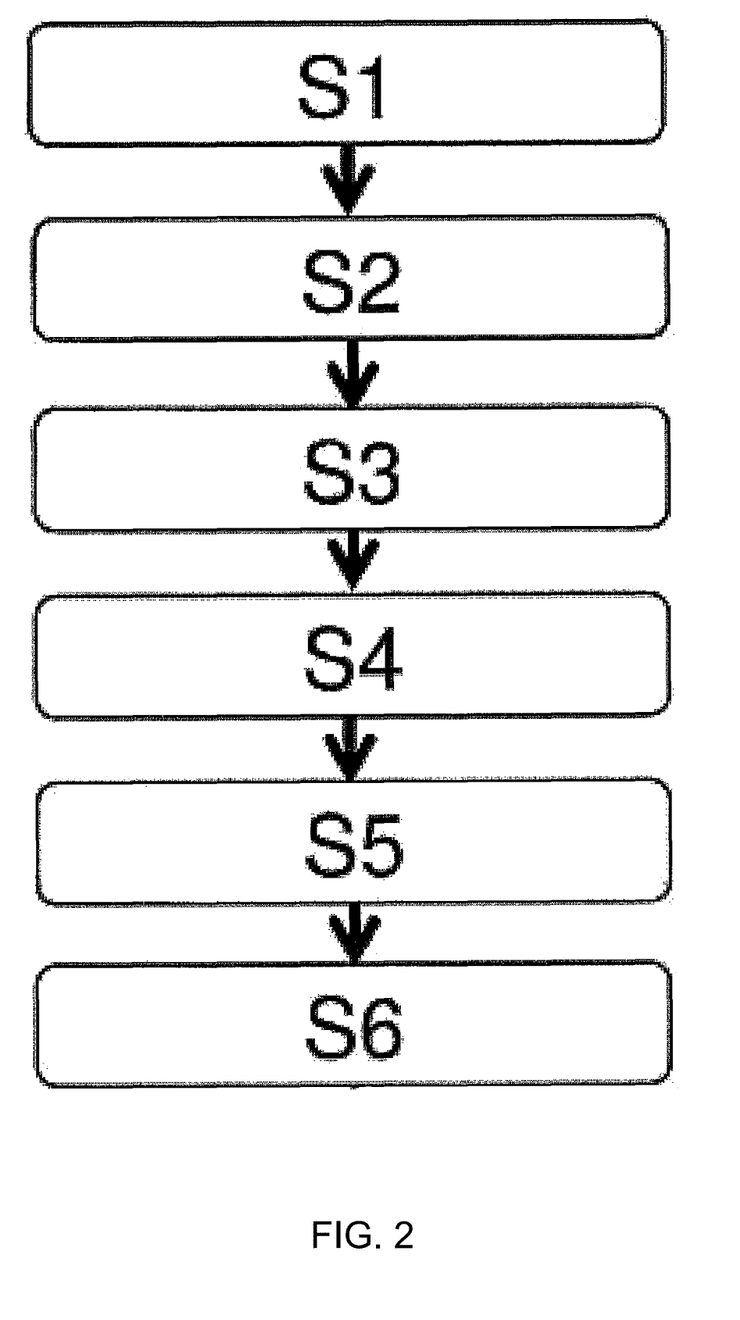
FIG. 2 a schematic flow chart of a method for determining a further inclined total electronic content, FIG. 3 a schematic flow chart of the method according to the invention in a first embodiment and FIG. 4 a schematic flow chart of the method according to the invention in a further embodiment.

A schematic flow chart for determining a further inclined total electronic content is illustrated in FIG. 2.

In a first step S1, a beam path SW (see FIG. 1) is selected, along which the further inclined total electronic content is to be determined. At the same time positions of a receiver Rx and of a transmitter Tx are determined.

In a second step S2, the selected beam path SW is calculated depending on the coordinates determined in the first step S1.

In a third step S3, the specification of a number of increments and the positions of the sample points S1, ... S4 is carried out. This can be carried out depending on accuracy requirements. During this it can be taken into account that the accuracy increases with increasing number of increments. In this step the calculation of the local elevation angle βi can advantageously also be carried out at the sample points.

In a fourth step S4, parameters of the Chapman profile function (see Formula 2) are specified. Furthermore, the initial vertical total electronic content vTEC1, ... vTEC4 for each vertical path vW1, ... vW4 is determined, for example from the previously described TEC map. The inclined increment electron content iIEC can thus be calculated to the first order. Thus the increment electron content iIEC is determined for each increment between the sample points S1, ... S4.

In a fifth step S5, the beam path-related total residual error for the inclined increment electron content is then estimated using the model approach.

In a sixth step S6, all increment electron contents iIEC and the total residual error are summed to a resulting electron content. This corresponds to the further inclined total electronic content that is being sought.

Figure 3:
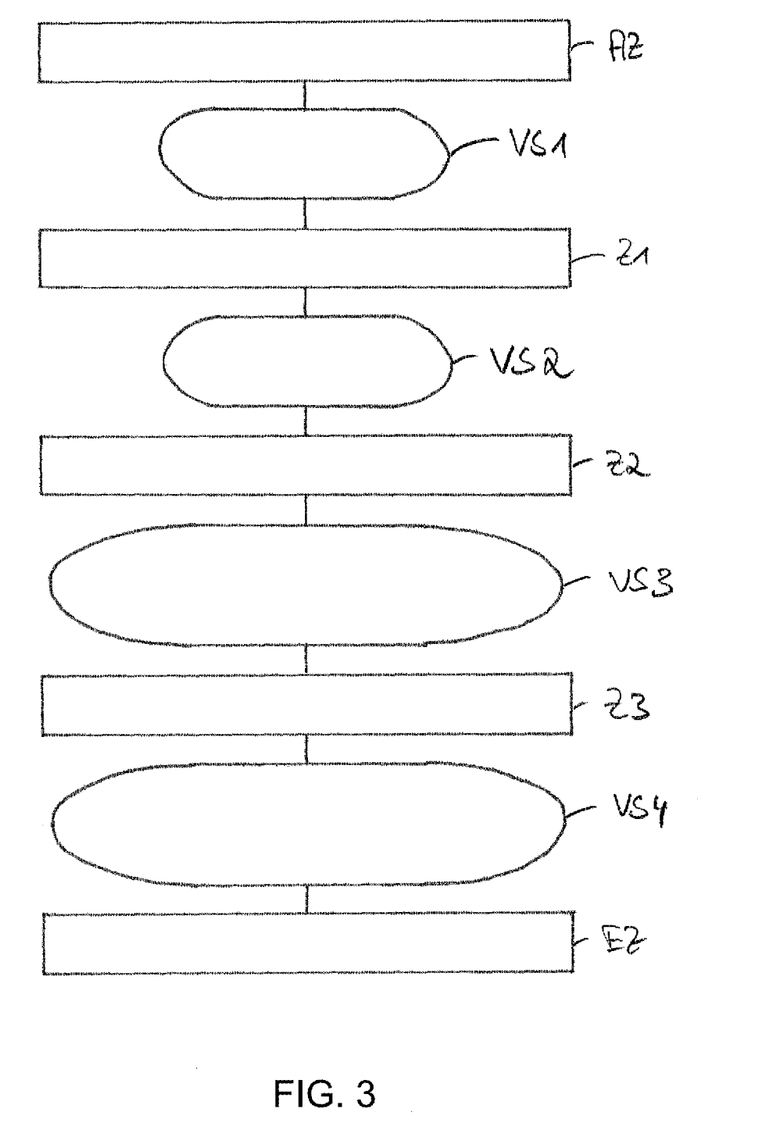

In FIG. 3, a schematic flow chart of the method according to the invention in a first embodiment is illustrated. In an initial state AZ, a previously determined first inclined total electronic content exists. Said first inclined total electronic content can for example be directly determined by means of a measurement or determined depending on measured transition time errors of radio signals along the beam path SW (see FIG. 1).

In a step of the method VS1, the determination of a plurality of initial vertical total electron contents vTEC1, ... vTEC4 is carried out. Said initial vertical total electron contents can for example be determined depending on the thin shell model that is described above. In a first state Z1, information about said initial vertical total electron contents vTEC1, ... vTEC4 is thus available. In a further step of the method VS2, the determination of the further inclined total electronic content is carried out. In the further step of the method VS2, for example the method described in FIG. 2 can be carried out.

In a second state Z2, the further inclined total electronic content is thus determined.

In a further step of the method VS3, a sample point specific conversion function is determined as the ratio between the further inclined total electronic content and the initial vertical total electronic content vTEC1, ... vTEC4, for which a new value is to be determined. In said ratio, the further inclined total electronic content forms the numerator and the corresponding initial vertical total electronic content vTEC1, ... vTEC4 forms the denominator.

If for example the first vertical total electronic content vTEC1 is to be determined (and to replace the value of the initial first total electronic content vTEC1), the further inclined total electronic content forms the numerator and the first initial vertical total electronic content vTEC1 forms the denominator.

A third state Z3 thus contains the sample point specific conversion function.

In a further step of the method VS4, the sample point specific vertical total electronic content vTEC1, vTEC2, vTEC3, vTEC4 is then determined from the first inclined total electronic content and the sample point specific conversion function. The sample point specific vertical total electron contents vTEC1, vTEC2, vTEC3, vTEC4 determined in this way can be different from the initial vertical total electron contents vTEC1, vTEC2, vTEC3, vTEC4 here and can subsequently replace them. Thus the TEC map 2 (see FIG. 1) can be replaced or updated.

In said ratio the first inclined total electronic content forms the numerator and the sample point specific conversion function forms the denominator.

If for example the first vertical total electronic content vTEC1 is to be determined (and to replace the value of the initial first total electronic content vTEC1), the first inclined total electronic content forms the numerator and the specific conversion function for the first sample point forms the denominator.

In an end state EZ, a new value for the vertical total electron contents vTEC1, vTEC2, vTEC3, vTEC4 thus exists.

Figure 4:
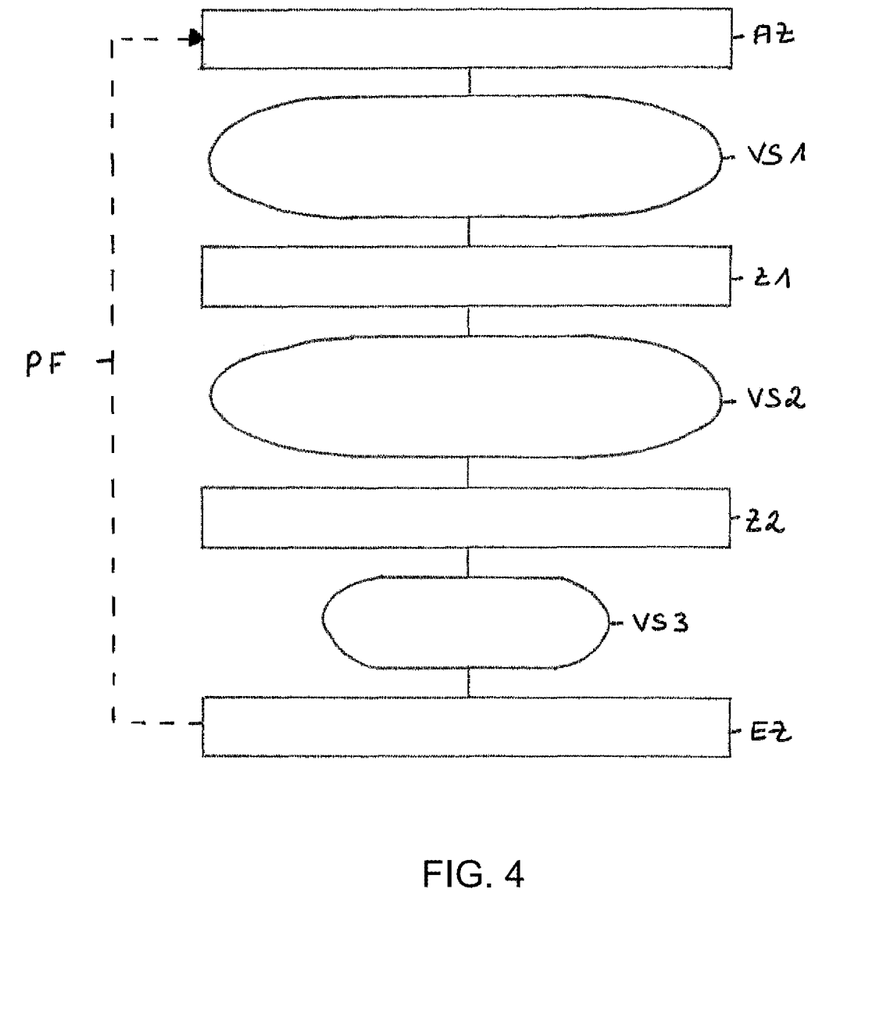

In FIG. 4, a schematic flow chart of the method according to the invention in a further embodiment is illustrated. Here it is assumed that information about the vertical total electron contents vTEC1, vTEC2, vTEC3, vTEC4 (see FIG. 1) is already known. Said information can also be used for determining the initial sample point specific total electron contents vTEC1, ... , vTEC4. In an initial state AZ, said previously known information about the vertical total electron contents vTEC1, vTEC2, vTEC3, vTEC4 is present for example in the form of a TEC map 2 (see FIG. 1) or in the form of a model. In a step of the method VS1, the determination of the further inclined total electronic content is carried out. In said step of the method VS1, for example the method described in FIG. 2 can be carried out.

In a first state Z1, the further inclined total electronic content is thus determined.

In a further step of the method VS2, for each sample point S1, ... S4 a sample point specific conversion function is determined as the ratio between the further inclined total electronic content and the corresponding previously known vertical total electronic content vTEC1, ... vTEC4.

A second state Z2 thus includes the sample point specific conversion functions.

In a further step of the method VS3, a detected or determined first inclined total electronic content is then taken into account in order to determine, for each sample point S1, ... , S4, a new sample point specific vertical total electronic content vTEC1, vTEC2, vTEC3, vTEC4 from the first inclined total electronic content and the sample point specific conversion function. Said new sample point specific vertical total electronic content vTEC1, vTEC2, vTEC3, vTEC4 is present in an end state EZ.

In FIG. 4, a dashed arrow PF indicates that said newly determined sample point specific vertical total electron contents vTEC1, vTEC2, vTEC3, vTEC4 can be used in an initial state AZ as the initial sample point specific vertical total electron contents vTEC1, vTEC2, vTEC3, vTEC4 for another pass through the proposed method.

The method is thus also used to produce very accurate TEC correction maps.

Overall, the method can be applied very well where highly accurate TEC maps are to be produced. Of course this applies to the field of science for the study of the ionosphere, but also to information and data services such as for example the DLR ionosphere weather service SWACI. In addition, for space travel applications suitable corrections can be provided by said TEC maps for determining transition times, for example in the currently operating satellite based auxiliary systems (Space Based Augmentation Systems—SBAS) such as the WAAS (Wide Area Augmentation System) in the USA and EGNOS (European Geostationary Overlay Service) in Europe.

Simulations have shown that much smaller deviations from the correct vertical TEC values along different beam paths can be achieved by means of the proposed method than with the use of the thin shell model.

The invention claimed is:

1. A method for determining at least one sample point specific vertical total electronic content, the sample point specific vertical total electronic content referring to an electron content along a sample point specific vertical path extending through a center of earth and a corresponding sample point, which comprises the steps of:
   determining a first inclined total electronic content, the first inclined total electronic content referring to an electron content along an inclined beam path between an earth based receiver and a transmitter in an earth orbit;
   selecting a first and at least one further sample point along the inclined beam path each disposed at an arbitrary altitude above a surface of the earth and the at least one further sample point being higher than the first sample point;
   determining an initial sample point specific vertical total electronic content for each sample point;
   determining an increment electron content in dependence on the initial sample point specific vertical total electronic content and a sample point specific vertical electron density distribution, the increment electron content referring to an electron content of an increment associated with the sample point;
   determining a further inclined total electronic content depending on the increment electron content;
   determining a sample point specific conversion function between the further inclined total electronic content and the initial sample point specific vertical total electronic content; and
   determining the at least one sample point specific vertical total electronic content from the first inclined total electronic content and the sample point specific conversion function, wherein the at least one sample point specific vertical total electronic content is determined for a determination of a propagation error.

2. The method according to claim 1, which further comprises determining the sample point specific conversion function as a ratio between the further inclined total electronic content and the initial sample point specific vertical total electronic content, the at least one sample point specific vertical total electronic content is determined as a ratio between the first inclined total electronic content and the sample point specific conversion function.

3. The method according to claim 1, wherein at least one of the initial sample point specific vertical total electronic content and the sample point specific vertical total electronic content is previously known or is determined based on a model.

4. The method according to claim 1, wherein all initial sample point specific vertical total electron contents are the same.

5. The method according to claim 1, which further comprises determining initial sample point specific vertical total electron contents depending on horizontal gradient information of a vertical total electronic content.

6. The method according to claim 1, which further comprises determining initial sample point specific vertical total electron contents from a TEC map, the TEC map provides information about a vertical total electronic content as a function of a latitude and a longitude.

7. The method according to claim 1, which further comprises carrying out the method for a plurality of sample points.

8. The method according to claim 1, which further comprises determining or describing the sample point specific electron density distribution based on a model.

9. The method according to claim 1, which further comprises additionally determining the electron content along the inclined beam path in dependence on a plasma sphere-related component.

10. The method according to claim 1, which further comprises compensating for vertical time transition errors in a transmission between the earth based receiver and the transmitter based on the at least one sample point specific vertical total electronic content.

11. The method according to claim 1, which further comprises using the at least one sample point specific vertical total electronic content for generating total electron contents (TEC) maps.

12. A system for determining at least one sample point specific vertical total electronic content, the sample point specific vertical total electronic content refers to an electron content along a sample point specific vertical path extending through a center of earth and a corresponding sample point, the system comprising:
   an earth based receiver;
   an transmitter in an earth orbit;
   at least one analyzer programmed to:
      determine a first inclined total electronic content, the first inclined total electronic content refers to the electron content along an inclined beam path between said earth based receiver and said transmitter in the earth orbit;
      select a first and at least one further sample point along the inclined beam path each disposed at an arbitrary altitude above a surface of the earth and the at least one further sample point being higher than the first sample point;
      determine an initial sample point specific vertical total electronic content for each sample point;
      determine an increment electron content in dependence on the initial sample point specific vertical total electronic content and a sample point specific vertical electron density distribution, the increment electron content refers to the electron content of an increment associated with the sample point;

determine a further inclined total electronic content from the increment electron content;

determine a sample point specific conversion function between the further inclined total electronic content and the initial sample point specific vertical total electronic content; and determine the at least one sample point specific vertical total electronic content from the first inclined total electronic content and the sample point specific conversion function, wherein the at least one sample point specific vertical total electronic content is determined for a determination of a propagation error.

* * * * *